United States Patent [19]

Ostermaier

[11] 4,229,930
[45] Oct. 28, 1980

[54] FLEXIBLE LINK FASTENER

[76] Inventor: Albert E. Ostermaier, 4710 Sunnyslope Ave., Sherman Oaks, Calif. 91403

[21] Appl. No.: 964,771

[22] Filed: Nov. 29, 1978

Related U.S. Application Data

[63] Continuation-in-part of Ser. No. 867,728, Jan. 9, 1978, abandoned.

[51] Int. Cl.² ............................ B68C 5/00; B44D 3/18
[52] U.S. Cl. .......................................... 54/79; 24/72.7; 24/201 A
[58] Field of Search ............. 24/72.7, 73 GC, 150 FP, 24/201 A, 206 A, 206 R, 143 B, DIG. 16, 102 A; 54/79

[56] References Cited

U.S. PATENT DOCUMENTS

| | | | |
|---|---|---|---|
| 342,800 | 6/1886 | Magoon | 54/79 |
| 344,313 | 6/1886 | Gutmann | 24/201 A |
| 441,249 | 11/1890 | Magraw | 54/79 |
| 470,411 | 3/1892 | Peck | 24/201 A |
| 701,896 | 6/1902 | Kinnear et al. | 24/DIG. 16 |
| 806,757 | 12/1905 | Steiner | 24/201 A |
| 3,382,546 | 5/1968 | Palmay et al. | 24/150 FP |
| 3,636,594 | 1/1972 | Faivre | 24/143 B |
| 3,850,297 | 11/1974 | Merser | 24/201 A |

FOREIGN PATENT DOCUMENTS

| | | | |
|---|---|---|---|
| 394334 | 6/1933 | United Kingdom | 24/201 A |
| 839704 | 6/1960 | United Kingdom | 24/72.7 |

*Primary Examiner*—William E. Lyddane
*Attorney, Agent, or Firm*—Jessup & Beecher

[57] ABSTRACT

A horse blanket incorporating a flexible link fastener for securing a blanket after it is put on a horse. The blanket has a pair of flanges having eyelets which come together across the chest of the horse in front of the forelegs. The flexible link fastener has a pair of bars joined by a perpendicular flexible elongate shaft member having a thick center portion which permits the rods or bars to be inserted in eyelets thus securing the blanket to the horse. The elongate flexible shaft joining the two bars allows each bar to be twisted endwise and slipped through the eyelet with the resilience of the joining member causing the bar to snap into a perpendicular position after passing through the eyelet.

5 Claims, 7 Drawing Figures

FLEXIBLE LINK FASTENER

This is a continuation-in-part of application Ser. No.867,728, filed Jan. 9, 1978, now abandoned.

BACKGROUND OF THE INVENTION

This invention relates to animal coverings and belts or fasteners for securing such covers and more particularly relates to horse blankets and fasteners for securing these blankets on a horse.

In order to prevent chilling or illness in horses, blankets are frequently used after exercising to keep the animal warm. These blankets fit over the horse and have a pair of flanges coming together at the chest of the horse secured together by a belt and overhand buckle fastener. A frequent problem, in addition to the inherent tangling and knotting of belts, is that the belt comes loose from the blanket and is lost after repeated uses. Cloth and leather belts are chewed and even eaten by horses and the latter sometimes leaves unsightly stains on light-colored show horses. Further, attachment and securing of the fastening belt can be cumbersome, difficult, and even a danger to the horse and handler. The hazard and difficulty is further increased by the fact the housing for these animals is frequently not well lighted.

SUMMARY OF THE INVENTION

The purpose of the present invention is to provide an easy and simple horse blanket having a quickly fastened flexible link connector to simplify securing the blanket on a horse.

The present invention is comprised of a horse blanket fitting around a horse and having a pair of flanges coming together beneath the chest of the horse. The flanges have a plurality of eyelets on either side which come together, overlap, and can be secured with a fastener. The fastener of the present invention is comprised of a pair of substantially stiff, relatively flexible bars secured at their centers by an elongate flexible resilient member having a thickened center portion, allowing each bar to be bent or twisted parallel to the flexible member so that it may be easily slipped through the eyelets of the horse blanket. The thick center portion of the resilient member provides some stiffness and strength to prevent stretching of the resilient member. Thus, only a portion of the ends of the resilient member has high flexibility which reduces the possibility of dislodgement. After the bar is slipped through the eyelet, the flexible link causes the bar to snap into a perpendicular position when released, securing the flexible link fastener to the blanket. By moving the two end rods to various positions in the overlapping eyelets, the blanket can be securely tightened around the animal. To remove the blanket, the rod is again twisted parallel to the flexible link and slipped through one eyelet, releasing one side of the blanket and allowing it to be easily removed. The two perpendicular rods on either end of the flexible link cannot readily come out of the eyelets because only a portion of the ends of the resilient member is highly flexible and therefore remain attached to the blanket preventing loss. The flexible link fastener or connector permits easy attachment and removal of horse blankets without any belts or overhand buckle connectors which are difficult to manipulate and frequently lost.

It is one object of the present invention to provide a horse blanket which is simple and easy to use having a fastener that may be quickly attached or removed.

Another object is to provide a fastener which can be quickly attached making it safer to use.

Still another object is to provide a fastener which, when not in use, is not easily detached and lost.

Yet another object is to provide a fastener which cannot harm the animal or the user.

Yet another object is to provide a horse blanket having a quick connecting flexible link fastener which may be easily inserted into eyelets and automatically snaps into place securing the horse blanket.

Other objects, advantages and novel features of the invention will become apparent from the following detailed description of the invention when considered in conjunction with the accompanying drawings, wherein like reference numbers identify like parts throughout.

DETAILED DESCRIPTION OF THE PREFERRED EMBODIMENT

Figure 1:
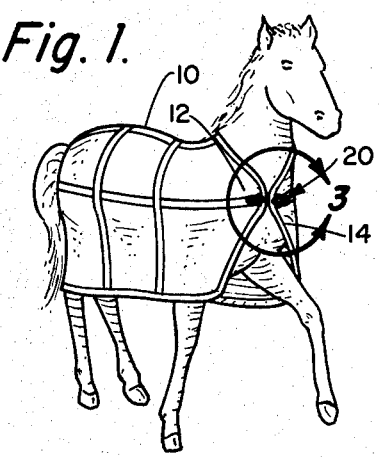
FIG. 1 illustrates a horse having the covering or horse blanket according to the invention.
Figure 3:
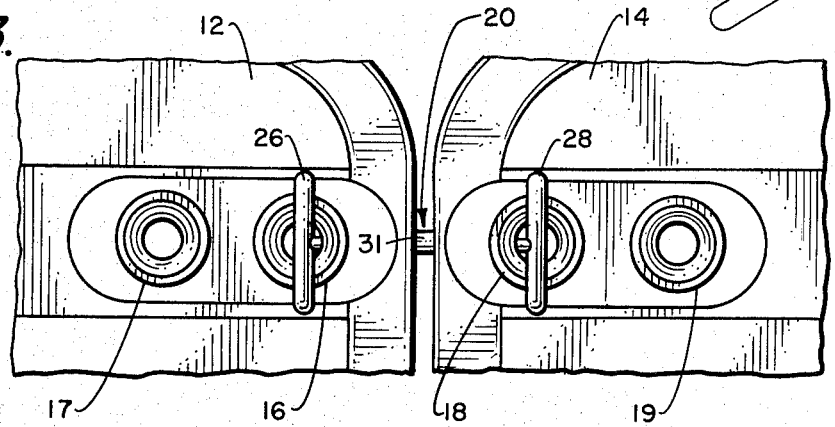
FIG. 3 is a detailed drawing taken from FIG. 1 illustrating the fastening of the blanket.

Blankets or coverings are frequently used on horses or other animals after strenuous exercising to prevent illness or disease due to chilling. Also, with show animals, the blanket keeps the animal's coat in better condition and is easier to groom. A horse is illustrated in FIG. 1 having a blanket 10 secured by a flexible link fastener according to the invention. The blanket 10 has panels or flanges 12 and 14 meeting across the chest of the horse in front of the forelegs which can be fastened to secure the blanket 10 to the horse. At the area across the chest of the horse, illustrated in FIG. 3, the blanket has eyelets 16 on one side and corresponding eyelets 18 on the opposite or adjacent panel of the blanket 10 to adjust the blanket to the width and size of the animal. A flexible link fastener 20 securely holds the blanket on the horse by cylindrical bars 26 and 28 secured in the eyelets on either side of the blanket panels.

Figure 2:
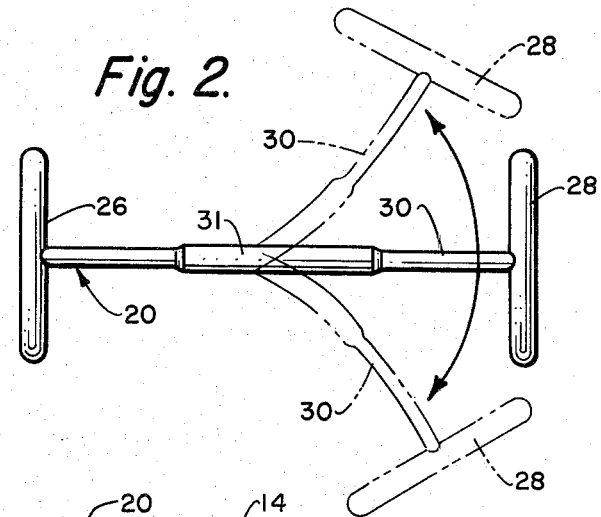
FIG. 2 illustrates the flexible link fastener or connector of the invention for securing the horse blanket illustrated in FIG. 1.

The flexible link fastener 20 is illustrated in greater detail in FIG. 2 and is comprised of bars 26 and 28 of a substantially stiff, relatively inflexible material normally connected at their center perpendicular to a flexible member 30 which can flex as illustrated in phantom lines. While the ends of elongate shaft or link 30 has a great deal of flexibility, the connecting points at the center of the vertical bars 26 and 28 normally maintain these bars substantially perpendicular to the flexible link.

Figure 7:
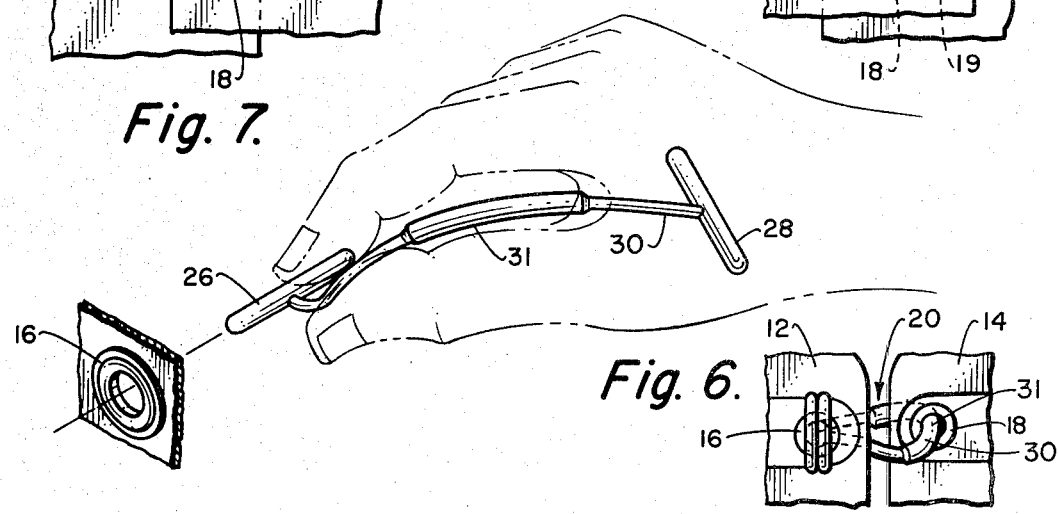
FIG. 7 illustrates the manner in which the flexible link fastener is manipulated to secure the horse blanket, as illustrated in FIG. 1.

The center of elongate cylindrical shaft or link 30 has a cylindrical thickened portion 31 to reduce stretching, which, after long periods of use, could cause the connector to loosen. The thickened portion 31 should preferably be about one-half the length of the shaft 30. Conversely, the flexible ends of the shaft 30 should be at least equal to the length of rods 26 and 28. This will assure sufficient flexibility to bend the rod 26 for insertion into the eyelet 16 as shown in FIG. 7, while providing some increased stiffness to reduce the possibility of the rods slipping out. The thickened portion 31 is in the range of approximately one-and-one-half (1½) to two times the thickness or diameter of the flexible ends. Preferably the flexible connector 20 is of homogeneous integral construction with the bars 26 and 28 being relatively stiff and inflexible while the link 30 is relatively flexible and pliant.

Figure 6:
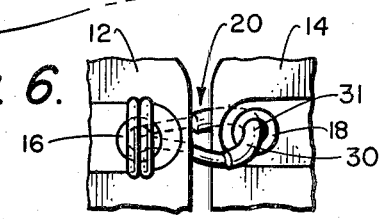

This flexibility and perpendicular arrangement permits the flexible fastener to be easily utilized as illustrated in FIG. 6. To install the flexible link connector in the horse blanket eyelets 16 and 18, the perpendicular bar 26 is bent or twisted to be substantially parallel to the flexible link 30 and can then be easily slipped through either of eyelets 16 or 18. When the bar is released, it snaps back to its perpendicular position relative to the flexible link, securing it to the eyelet. The stiffness of the perpendicular bars 26 and 28 maintains them substantially perpendicular to the flexible link, securing them to the eyelets.

Figure 4:
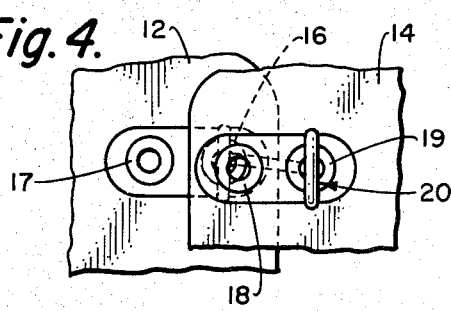
FIGS. 4, 5 and 6 illustrate the various connections of the flexible link fastener of FIG. 2.
Figure 5:
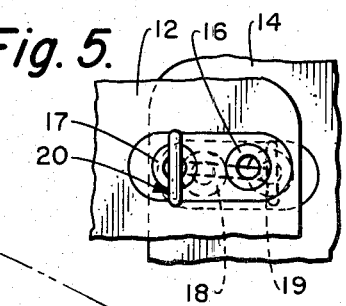

The width of the blanket is adjusted by overlapping the eyelets as illustrated in FIGS. 4, 5 and 6. In FIGS. 4 and 5 the blanket 10 is secured by slipping the fastener with one end through the holes in one flange 12 and the other end in the first or second hole in the other flange 14. As can be seen in FIG. 6, the flanges can easily be drawn tighter by folding the fastener 20 back on itself and snapping the stiff bar back through the same eyelet. The thickened center portion 31 has sufficient flexibility to permit this. Thus, the tightest adjustment would be to insert one bar 26 through the inside eyelet 19 and back on itself through the eyelet 17, similar to the method shown in FIG. 6. However, this arrangement is not preferable because of the added stiffness due to the thickened portion 31. This would draw the flanges in an overlapping arrangement with the eyelets 16 through 19 almost entirely overlapping.

Thus, there has been disclosed a novel flexible link fastener for use with horse blankets and the like which is easily attached or connected to secure a horse blanket, but cannot easily fall off. The two perpendicular rods on each end of the flexible link are invariably made of a non-abrasive type of material, such as hard rubber or plastic so that they may maintain their stiffness but yet not be capable of causing any injury or harm. The ends of the rods are also rounded for the same purpose.

Obviously, many modifications and variations of the present invention are possible in light of the above teachings. It is therefore to be understood that the full scope of the invention is not limited to the details disclosed herein but may be practiced otherwise than as specifically described.

What is claimed is:

1. A fastening system for a horse blanket or the like comprising:
   a blanket having a pair of opposing flanges and adapted to cover a horse;
   said flanges adapted to come together around the horse and having a plurality of eyelets in said opposing flanges adapted to overlap to adjust the fit of said blanket;
   a flexible link fastener adapted to engage and join respective eyelets in said flanges to secure said blanket;
   said fastener comprising:
   an elongate cylindrical flexible shaft;
   a pair of substantially stiff cylindrical bars attached at each end of said flexible shaft;
   said flexible shaft having a cylindrical thickened portion of at least one-half the length of the flexible shaft and narrower, more flexible end portions;
   the thickened portion being at least one-and-one-half times the diameter of the end portions;
   the ends of said flexible shaft being connected substantially perpendicular to the stiff bars when in an unflexed position at the mid-point of said stiff bars;
   said stiff bars being passed through respective eyelets in said opposed flanges thereby securing said blanket to a horse.

2. The flexible link fastener according to claim 1 wherein said pair of bars are formed of a relatively inflexible non-abrasive material.

3. The flexible link fastener according to claim 2 wherein said pair of bars are formed of a hard rubber.

4. The flexible link fastener according to claim 1, wherein the length of the flexible ends of said elongate flexible shaft are approximately equal to the lengths of the stiff bars.

5. The flexible link fastener according to claim 1 wherein the thickened portion of the shaft is in the range of 1½ to 2 times the diameter of the flexible ends.

* * * * *